(12) United States Patent
Heier et al.

(10) Patent No.: US 9,930,295 B2
(45) Date of Patent: Mar. 27, 2018

(54) SOFTWARE, SYSTEMS, AND METHODS FOR VIDEO RECORDING OF A TRANSACTION INVOLVING PROTECTED DATA

(75) Inventors: Kurt Heier, Westminster, CO (US); Eran Wachman, Hampstead (CA)

(73) Assignee: VERINT SYSTEMS INC., Santa Clara, CA (US)

(*) Notice: Subject to any disclaimer, the term of this patent is extended or adjusted under 35 U.S.C. 154(b) by 1163 days.

(21) Appl. No.: 13/293,782

(22) Filed: Nov. 10, 2011

(65) Prior Publication Data

US 2012/0127315 A1  May 24, 2012

Related U.S. Application Data

(60) Provisional application No. 61/415,340, filed on Nov. 18, 2010.

(51) Int. Cl.
*H04N 7/18* (2006.01)

(52) U.S. Cl.
CPC .................................. *H04N 7/181* (2013.01)

(58) Field of Classification Search
CPC ............. H04N 7/181; H04N 2201/212; G08B 13/19665
USPC ................................................. 348/150, 143
See application file for complete search history.

(56) References Cited

U.S. PATENT DOCUMENTS

| 2003/0048202 A1* | 3/2003 | Francois ....................... 340/945 |
| 2004/0135885 A1* | 7/2004 | Hage ............................. 348/143 |
| 2005/0128314 A1* | 6/2005 | Ishino .......................... 348/222.1 |

OTHER PUBLICATIONS

"Bang Preceeds Tower Crash" Mutual Press Clipping Service Inc. Apr. 7, 1991.*

* cited by examiner

*Primary Examiner* — William C Vaughn, Jr.
*Assistant Examiner* — Naod Belai
(74) *Attorney, Agent, or Firm* — Meunier Carlin & Curfman

(57) ABSTRACT

Software, systems, and methods for recording a scene encompassing a transaction, such as a point-of-sale transaction, are presented. In one implementation of a method, the scene is recorded to a data storage system using a first video camera capable of capturing protected data associated with the transaction. While recording the scene using the first camera, and in response to receiving a first trigger, the recording of the scene is continued using a second video camera not capable of capturing the protected data. While then recording the scene using the second camera, and in response to receiving a second trigger, the recording of the scene is continued using the first video camera. The first and second timing triggers are initiated based on at least one event associated with the transaction.

20 Claims, 5 Drawing Sheets

SOFTWARE, SYSTEMS, AND METHODS FOR VIDEO RECORDING OF A TRANSACTION INVOLVING PROTECTED DATA

RELATED APPLICATIONS

This patent application is related to and claims priority to U.S. Provisional Patent Application No. 61/415,340, entitled "Video Recording of a Transaction Involving Protected Data," filed on Nov. 18, 2010, which is hereby incorporated by reference in its entirety.

TECHNICAL BACKGROUND

To protect the interests of both business owners and their patrons, places of business are often equipped with video cameras and associated recording equipment to record events occurring thereat. These video capture systems may ultimately serve several purposes, including the capture of transactions and other events for video analysis related to the operation of the business, the identification of perpetrators of crimes committed at the place of business, and the deterrence of potential criminal activities on the premises. The types of business locations employing such video capture systems include, but are not limited to, grocery stores, department stores, and automated teller machines (ATMs).

The quality of these video capture systems has progressed to the point where sensitive or protected information, such as customer identification information, credit and bank account information, and the like, may be captured clearly in the resulting video camera recording. Depending on the federal, state, and local laws governing a particular business location, the storage and/or transmission of video data incorporating such protected information may be prohibited or restricted. As a result, in some cases the video data generated from such systems may require manual editing or other modification before transmission or storage of the video data for the data to comport with the applicable rules and regulations.

OVERVIEW

Embodiments disclosed herein provide software, systems, and methods for recording a scene encompassing a transaction. In a particular implementation, the scene is recorded to a data storage system using a first video camera capable of capturing protected data associated with the transaction. While recording the scene using the first video camera, in response to a first timing trigger, the recording of the scene is continued using a second video camera not capable of capturing the protected data. While then recording the scene using the second video camera, and in response to receiving a second timing trigger, the recording of the scene is continued using the first video camera. The first and second timing triggers are initiated based on at least one event associated with the transaction.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
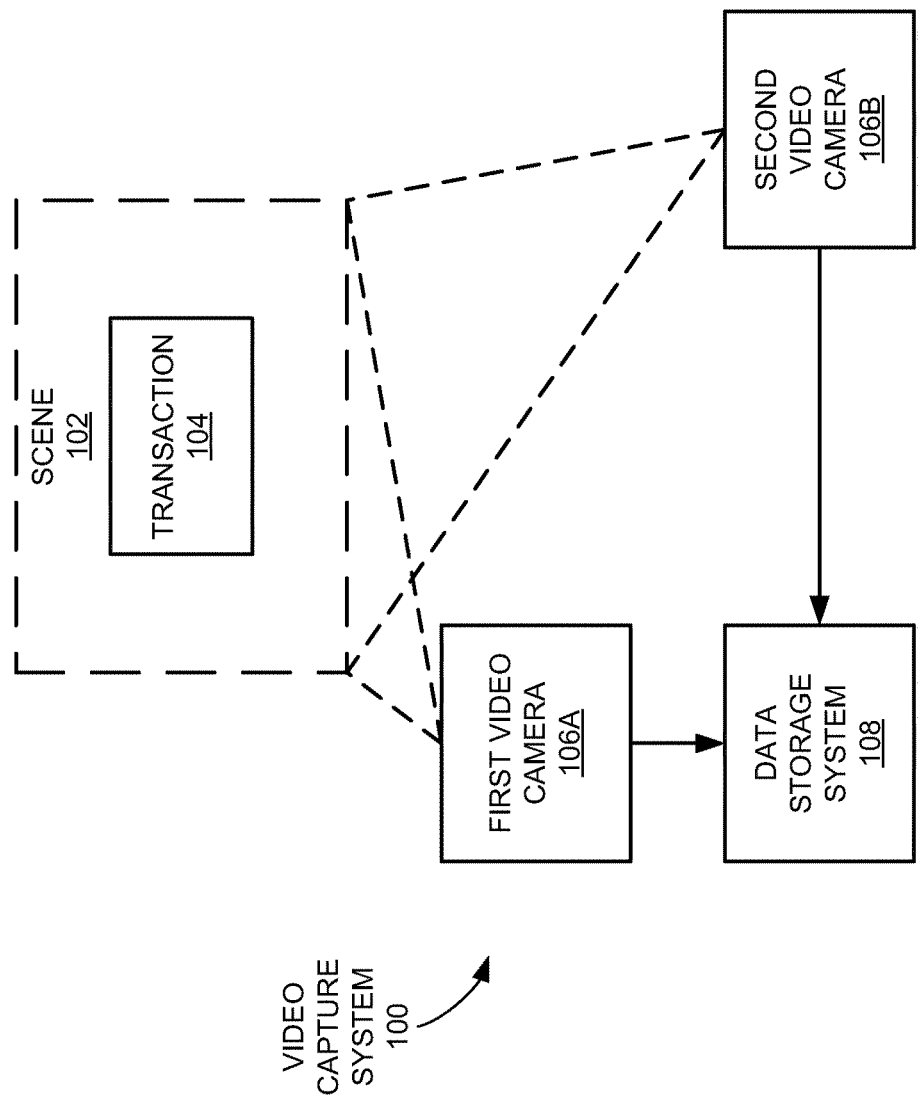
FIG. 1 illustrates a video capture system according to an embodiment of the invention.

FIG. 1 illustrates a video capture system 100 according to one embodiment. The video capture system 100 includes at least a first video camera 106A and a second video camera 106B, each of which provide video data to a data storage system 108. While the cameras 106A, 106B and the data storage system 108 are depicted as three separate components, other arrangements involving greater or fewer components may be employed in other implementations of the video capture system 100 while retaining the characteristics and functionality of the video capture system 100 described below.

As shown in FIG. 1, the video cameras 106A, 108A are oriented to capture a scene 102 generally occurring within a predetermined location or area at which one or more transactions 104 make occur. In one example, the scene 102 may be an area employed for point-of-sale (POS) transactions, such as a cash register or self-service product purchase scanning terminal. Other areas, such as automated teller machine (ATM) locations for making banking account withdrawals and/or deposits, may serve as the scene 102 of FIG. 1. Other examples of scenes 102 in which a transaction 104 may occur may be employed in other implementations.

In the scene 102, the execution of the transaction 104 may involve the exposure or other indication of "protected data" that a party to the transaction 104 may desire to protect from public disclosure. Examples of such data may include, but are not limited to, credit card numbers, license driver numbers, Social Security numbers, personal identification numbers (PINs), home addresses, phone numbers, birthdates, signatures, images of family members, and other personal information, including combinations thereof. However, given the enhanced resolution capabilities of many video cameras currently available, such protected data may be easily captured as video data. For example, a video camera capturing a transaction may provide enough resolution to capture data residing on a credit card, driver's license, or personal check. In other instances, such a camera may also clearly record keypad entries by a customer or employee, such as PINs and other codes. Storage and/or transmission of various forms of protected data may not only be counter to the wishes of the customer or business owner, but may be prohibited or limited by applicable laws.

To address this issue, in the video capture system 100, the video cameras 106A, 106B do not provide the same level or type of coverage of the scene 100. More specifically, the first video camera 106A may be configured to capture at least one item of protected data during the transaction 104, while the second video camera 106B may be configured to provide at least some viewing coverage of the scene 102 without capturing the protected data of the transaction 104. For example, the first video camera 106A may provide an overhead view of a POS area, whereby at least some aspect of the transaction 104 involving protected data may be captured, whereas the second video camera 106B may be positioned to capture the same scene 102, but from a different angle not capable of capturing protected data involved in the transaction 104. In another implementation, the two cameras 106A, 106B may provide similar viewing angles of the scene 102, but only the first camera 106A may provide the zoom and/or resolution capability to capture protected data. For instance, the first video camera 106A may be a high-definition camera, while the second video camera 106B may be a standard-definition camera. Other differences between the configurations of the first video camera 106A and the second video camera 106B may be employed to result in the differing data capturing abilities between the two cameras 106A, 106B. In other embodiments, more than two such cameras 106A, 106B may be employed to provide multiple views of the scene 102, with at least one of the cameras being arranged such that capture of protected data is not possible.

In yet another example, each of cameras 106A, 106B comprise digital video compression or encoding circuitry and software. A compression or encoding technique, of second video camera 106B could preclude capturing protected data involved in the transaction 104 due to increased noise or video artifacts of the compression technique as compared to a compression or encoding technique of first video camera 106A.

Figure 2:
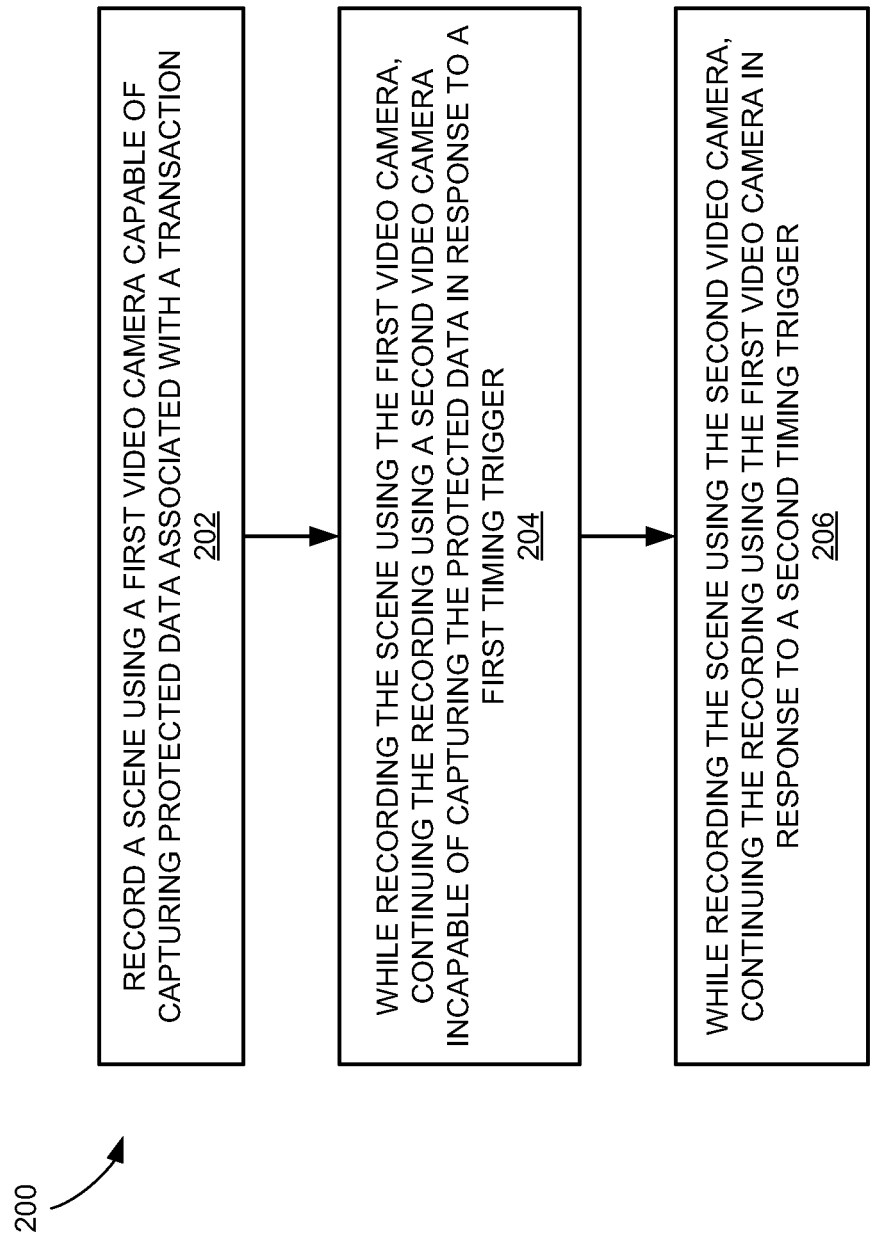
FIG. 2 illustrates a method of operating a video capture system according to an embodiment of the invention.

A method 200 of operating a video capture system, such as the video capture system 100 of FIG. 1, is presented in FIG. 2. In the method 200, using the system 100 as an example, the scene 102 is recorded using the first video camera 106A capable of capturing protected data associated with the transaction 104 (operation 202). While the scene 102 is being recorded using the first video camera 106A, and in response to a first timing trigger, the recording is continued using the second video camera 106B incapable of capturing the protected data (operation 204). Thereafter, while the scene 102 is being recorded using the second video camera 106B, the recording is continued using the first video camera 106A in response to a second timing trigger (operation 206). In one implementation, the first and second timing triggers are initiated based on at least one event associated with the transaction 104.

As a result of operating the video capture system 100 according to the method 200, video data captured by the first video camera 106A during at least one time period of the transaction 104 may contain a view of protected data involved in the transaction 104. Such video is effectively replaced or substituted by video data captured via the second video camera 106B. As is described in greater detail below, such replacement or substitution may occur while the video data from the cameras 106A, 106B are being recorded in the data storage system 108, or while the video data are being transferred from the data storage system 108 to another destination.

As indicated above, the first and second timing triggers are based on at least one event or activity associated with the transaction 104. For example, the first timing trigger may occur in response to an action by a customer or employee, such as the swiping of a credit card in a card reader. In other examples, the first timing trigger may be generated in response to a customer approaching or entering a predefined area of the scene 102, such as an area surrounding the card reader.

In another implementation, audio or speech detection may be employed to determine whether protected data is about to be presented. For example, an employee requesting a particular action of a customer, such as asking the customer to present a credit card, or to type a PIN into a keypad, that signals the forthcoming protected data may cause initiation of the first timing trigger. In another instance, an employee requesting personal information, such as an address or phone number, may initiate the first timing trigger. Other actions or events involving the transaction 104 may be employed to generate the first timing trigger in other implementations.

Similarly, the second timing trigger may be generated by any single event, or combination of events, involving the transaction 104. In one embodiment, the customer involved in the transaction 104 leaving a particular area, such as the area in front of a card reader, may initiate the second timing trigger. In another example, the completion of the transaction 104, such as the generation or printing of a receipt, or completion of an authorization to charge a bank or credit account, may be employed as the initiating event for the second timing trigger. Further, audio or speech processing may be employed to detect parting comments by either the employee or customer that are typically associated with the completion of the transaction 104, thus initiating the second timing trigger. Other actions by either employee or customer may be utilized in other implementations to generate one or both of the timing triggers.

In another example, the second timing trigger may be generated based upon a timing delay after the first timing trigger. One example of such a delay may be a set period of time after which the initiation of the transaction 104, such as a credit card swipe through a card reader, may initiate a delay of a predetermined period of time, such as thirty seconds or one minute, before generating the second timing trigger. Other initiating events, as well as other timing delays, may be employed in other embodiments. In yet further examples, transaction 104 is processed through or payment made by a mobile device, tablet, or smart phone of a customer, such as in a near-field communication (NFC) transaction. The first or second timing triggers may be responsive to operation of the mobile device, such as responsive to initiation and termination of the near-field communications, or from a signal generated by the scanning device or wireless point-of-sale device of the store.

Figure 3:
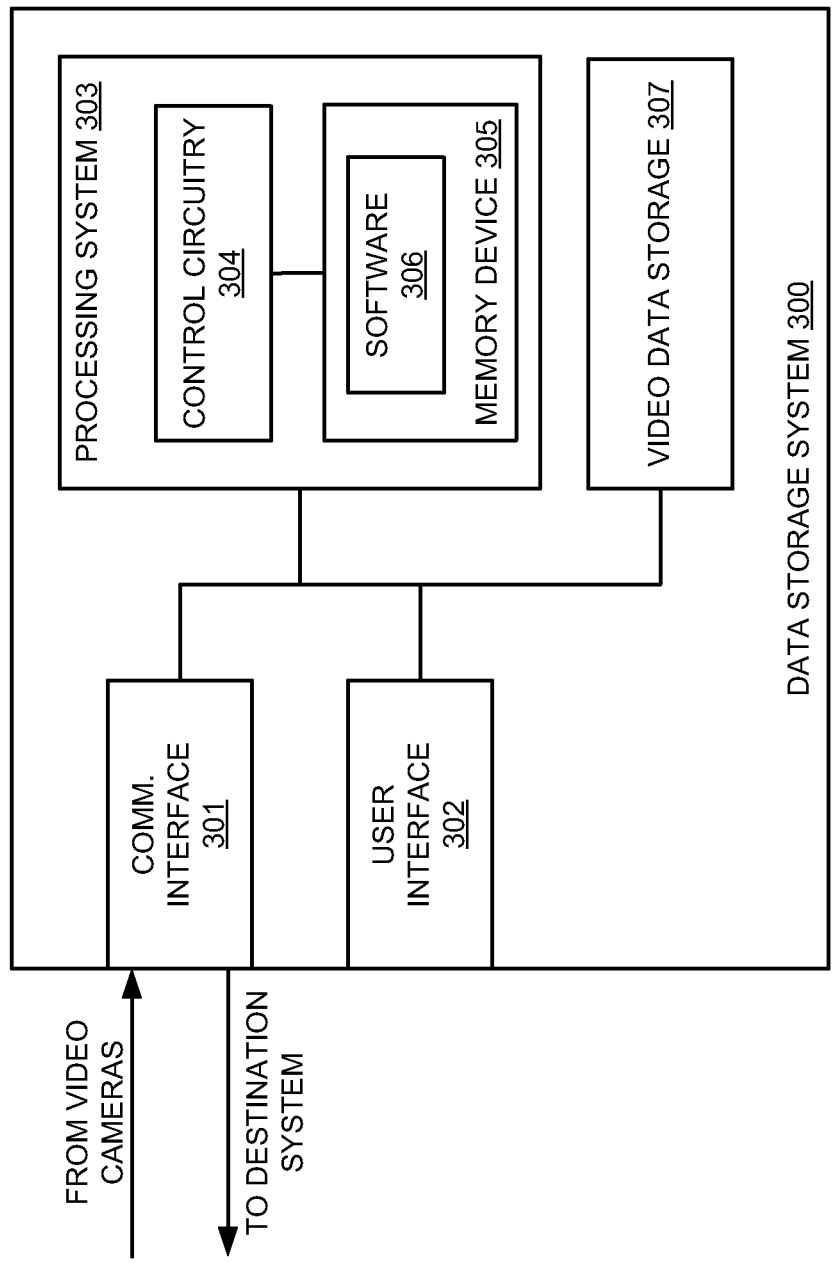
FIG. 3 illustrates a data storage system according to an embodiment of the invention.

FIG. 3 depicts a data storage system 300 as a possible example of the data storage system 108 of FIG. 1, although the data storage system 100 may utilize alternative configurations. The data storage system 300 of FIG. 3 includes a communication interface 301, a user interface 302, a processing system 303, and video data storage 307. The processing system 303 is linked to the communication interface 301 and the user interface 302. The processing system 403 includes control circuitry 304 and at least one memory device 305 that stores operating software 306.

The communication interface 301 includes one or more components that communicate over communication links, such as network cards, ports, radio frequency (RF) transceivers, processing circuitry and software, or some other communication devices. The communication interface 301 may be configured to communicate over metallic, wireless, or optical links. The communication interface 301 may be configured to use time-division multiplexing (TDM), Internet Protocol (IP), Ethernet, optical networking, wireless protocols, communication signaling, or some other communication format, including combinations thereof. As employed in FIG. 3, the communication interface 301 is configured to receive video data from a plurality of video cameras, as well as to transfer the received video data to a destination system, such as a financial establishment or law enforcement agency. The communication interface 301 may also receive event information, such as proximity information, data related to a credit card swipe or authorization, or other information related to the transaction to generate the timing triggers noted above.

The user interface 302 includes components that interact with a user. The user interface 302 may include a keyboard, display screen, mouse, touch pad, or some other user input/output apparatus. The user interface 302 may be omitted from the data storage system 300 in some examples.

The video data storage 307 may be any type of volatile or nonvolatile data storage component or system, including, but not limited to, a magnetic or optical disk drive, static or dynamic random access memory (RAM), solid state memory, or flash memory. In some examples, video data storage 307 comprises a computer-readable, non-transitory memory.

The control circuitry 304 includes, for example, a microprocessor and/or other circuitry that retrieves and executes operating software 306 from the memory device 305. The memory device 305 includes a disk drive, flash drive, data storage circuitry, solid state memory, or some other computer-readable, non-transitory memory apparatus. The operating software 306 contains computer programs, firmware, or some other form of machine-readable processing instructions. The operating software 306 may include an operating system, utilities, drivers, network interfaces, applications, or some other type of software. When executed by the control circuitry 304, the operating software 306 directs the processing system 303 to operate the data storage system 300 as described herein.

Figure 4A:
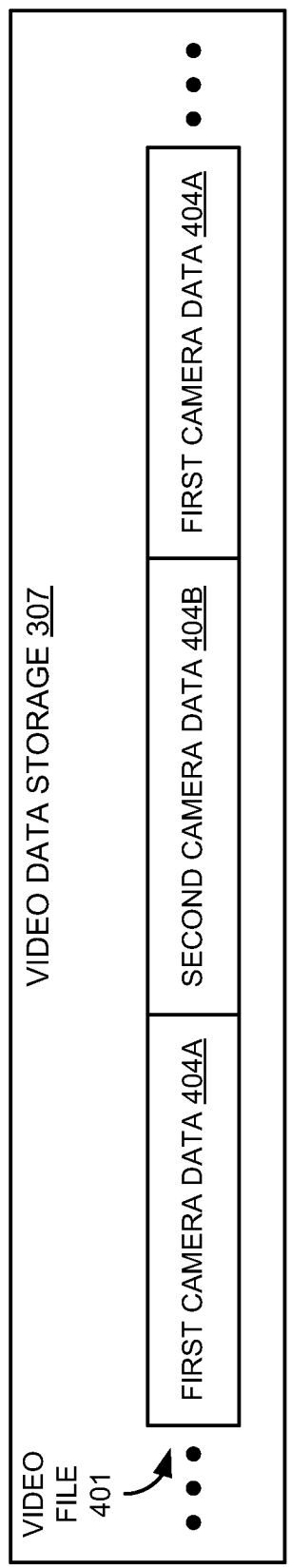
FIG. 4A illustrates a video file stored in video data storage in the data storage system of FIG. 3 according to an embodiment of the invention.

In particular, the operating software 306 directs the processing system 303 in one embodiment to provide a video recording in which protected data associated with a transaction is not captured or represented in the recording, as described above in relation to the method 200 of FIG. 2. FIG. 4A presents an example of such a recording, embodied as a video file 401 stored within the video data storage 307 of the data storage system 300 depicted in FIG. 3. In this implementation, the video file 401 contains video data which does not capture or otherwise indicate protected data. More specifically, in the video file 401, a portion of first camera data 404A of the video file 401 received from the first video camera 106A is replaced with second camera data 404B received from the second video camera 106B. As described above, the beginning and ending points of the portion of the first camera data 404A substituted by the second camera data 404B may be indicated by way of the first and second timing triggers discussed above.

To generate the video file 401 in one implementation, the processing system 303 of the data storage system 300 may store the first camera data 404A being received from the first video camera 106A into the video file 401 until the processing system 303 generates or detects the first timing trigger based upon one or more events associated with the transaction 104. In response to the first timing trigger, the processing system 303 then continues writing to the video file 401 using the second camera data 404B currently being received from the second video camera 106B, thus ceasing or suspending the transfer of the first camera data 404A to the file 401A. While the second camera data 404B is being stored to the video file 401, the generation or reception of the second timing trigger in the processing system 303 then causes the processing system 303 to cease or suspend transferring the second camera data 404B being received from the second video camera 104B, and to resume recording of the first camera data 404A currently being received from the first video camera 10B to the video file 401.

As a result, the processing system 303 is capable of generating the video file 401 free from the inclusion of any protected data "on-the-fly" as the first camera data 404A and the second camera data 404B are being streamed to the data storage system 300 from the cameras 406A, 106B. Such an implementation may preclude the storage of any protected data, although separate recording of the portion of the first camera data 404A substituted by the second camera data 404B into another video file (not shown in FIG. 4A) is possible in other embodiments.

Figure 4B:
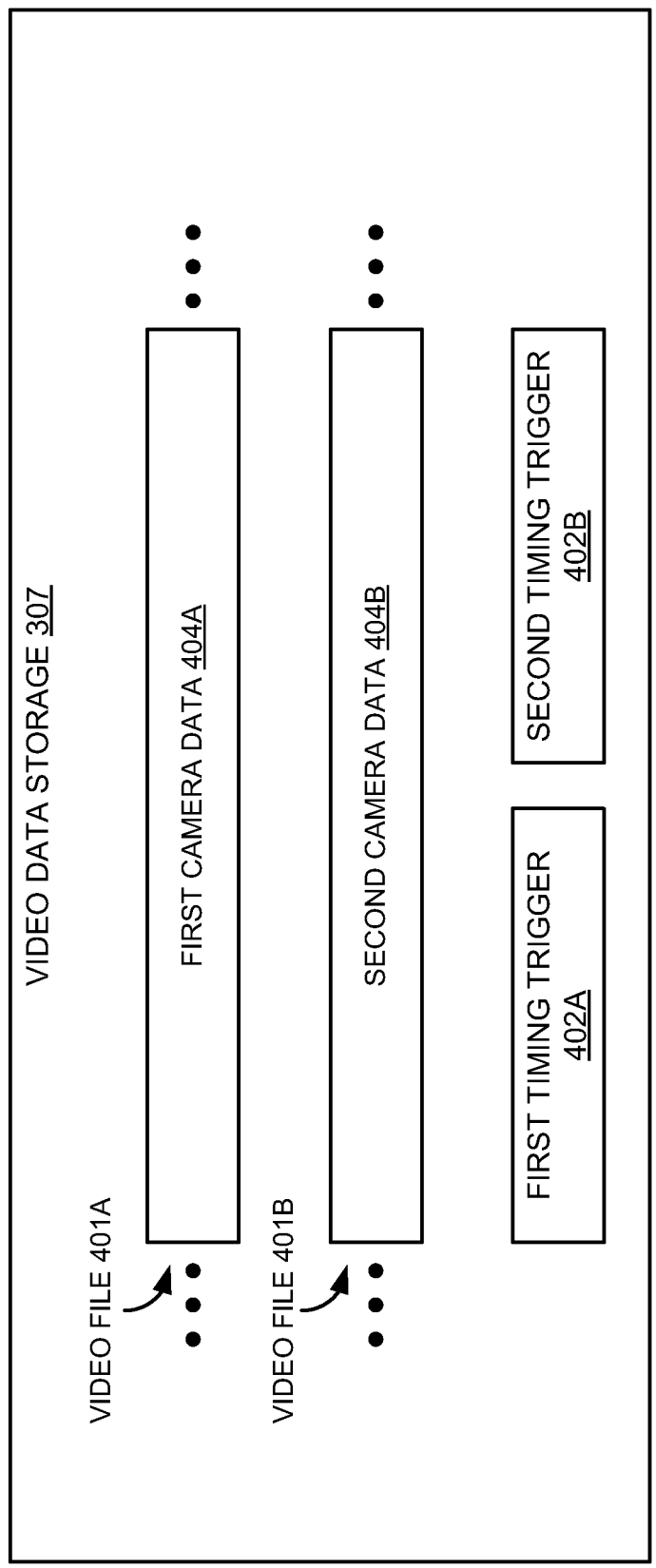
FIG. 4B illustrates video files stored in video data storage in the data storage system of FIG. 3 according to another embodiment of the invention.

FIG. 4B provides another example of the video data storage 307 in which two separate video files 401A, 401B are recorded: one file 401A for the first camera data 404A received from the first video camera 106A, and another file 401B to store the second camera data 404B received from the second video camera 106B. In this implementation, all of the video data from both cameras 106A, 106B, including video data representing or revealing protected data captured by the first video camera 106A, are stored in the video data storage 307.

Also stored within the video data storage 307, or elsewhere within the processing system 303, are a first timing trigger value 402A for the first timing trigger, and a second timing trigger value 402B for the second timing trigger. In one example the trigger values 402A, 402B represent time values, such as timestamps embedded within the first camera data 404A and the second camera data 404B, that indicate the starting time and ending time of a portion of the first camera data 404A which is to be substituted with the corresponding portion of the second camera data 404B. A video file (such as the video file 401 of FIG. 4A) generated from the first camera data 404A and substituted in part by the second camera data 404B may then be transferred directly from the processing system 303 via the communication interface 301 to a destination system without storing the resulting file in the video data storage 307. In another embodiment, the resulting mixed video file may be stored in the video data storage 307 for subsequent transfer and/or analysis.

By storing the entirety of both the first camera data 404A and the second camera data 404B in the video data storage 307, all of the data available from both cameras 106A, 106B may be accessed for future reference. Such an implementation may be useful, for example, in situations in which a federal agency interested in the financial aspects of the transaction 104 may desire access to the protected data captured in the first camera data 404A, while other parties, such as local law enforcement, may request access to a view of the scene 102 without unnecessarily viewing any protected data. To that end, both edited and unedited versions of a video file containing the first camera data 404A may be stored in the video data storage 307. To protect a video file that contains a view or representation of the protected data, such as the video file 401A, the processing system 303 may process such a video file to prevent unauthorized access to that video data, such as by way of encoding or encrypting the video files carrying the protected data. The resulting encoded or encrypted video file may then be stored safely over the long term in the data storage system 300, or transmitted therefrom to other destination systems.

In some examples, in response to a request for video file 401A, processing system 303 may transfer a first portion of video file 401A until indicated by the first timing trigger value. In response to the first timing trigger value, processing system 303 may suspend transfer of the first portion of video file 401A and transfer a first portion of video file 401B until indicated by the second timing trigger value. In this example, the first portion of video file 401B would be transferred in the place of portions of video file 401A. In response to the second timing trigger value, processing system 303 may then transfer a second portion of video file 401A and ceasing transfer of video file 401B. The portions of the various video files could be determined by the first and second timing trigger values, such as timestamps, frame numbers, or other values.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method for recording a scene encompassing a transaction, the method comprising:
    recording the scene to a data storage system using a first video camera capable of capturing protected data associated with the transaction;
    while recording the scene using the first video camera, responsive to receiving a first timing trigger, continuing the recording of the scene to the data storage system using a second video camera not capable of capturing the protected data; and
    while recording the scene using the second, different video camera, responsive to receiving a second timing trigger, continuing the recording of the scene to the data storage system using the first video camera;
    wherein the first timing trigger and the second timing trigger are initiated based on at least one event associated with the transaction; and
    wherein further, audio detection is employed to determine whether the protected data is about to be presented, and responsive to said audio detection, initiating the first timing trigger.

2. The method of claim 1, further comprising:
    responsive to receiving the first timing trigger, suspending recording the scene using the first video camera; and
    responsive to receiving the second timing trigger, suspending recording the scene using the second video camera.

3. The method of claim 1, wherein recording the scene to the data storage system using the first video camera comprises recording the scene using the first video camera to a video file on the data storage system;
    wherein continuing the recording of the scene to the data storage system using the second video camera comprises recording the scene using the second video camera to the video data file on the data storage system and suspending recording the scene to the video file using the first video camera; and
    wherein continuing the recording of the scene to the data storage system using the first video camera comprises recording the scene to the video data file on the data storage system and suspending recording the scene to the video file using the second video camera.

4. The method of claim 1, further comprising: recording the scene using the first video camera to a first video file; recording the scene using the second video camera to a second video file; responsive to receiving the first timing trigger, continuing recording the scene using the first video camera and recording a first timing trigger value to the data storage system; and responsive to receiving the second timing trigger, continuing recording the scene using the second video camera and recording a second timing trigger value to the data storage system.

5. The method of claim 4, further comprising: in response to a request for the first video file, transferring a first portion of the first video file until indicated by the first timing trigger value; in response to the first timing trigger value, suspending transfer of the first portion of the first video file and transferring a first portion of the second video file until indicated by the second timing trigger value; in response to the second timing trigger value, transferring a second portion of the first video file and ceasing transfer of the second video file.

6. The method of claim 1, wherein the first timing trigger comprises an event associated with the transaction.

7. The method of claim 1, wherein the first video camera comprises a greater video resolution than the second video camera.

8. The method of claim 1, wherein the second video camera captures the scene from a different angle than the first video camera, and wherein the second video camera is not capable of capturing the protected data involved in the transaction at the different angle.

9. A video system for recording a scene encompassing a transaction, the video system comprising:
    a memory that stores computer-executable instructions;
    a communication interface that receives video data;
    a data storage system that stores video data; and
    a processing system,
    wherein the processing system executes the computer-executable instructions stored in the memory to record the scene to the data storage system using a first video camera capable of capturing protected data associated with the transaction,
    wherein when the processing system receives a first timing trigger while recording the scene using the first video, the processing system records the scene to the data storage system using a second video camera not capable of capturing the protected data instead of the first video camera,
    wherein when the processing system receives a second timing trigger while recording the scene using the second, different video camera, the processing system returns to recording the scene to the data storage system using the first video camera,
    wherein the first timing trigger and the second timing trigger are initiated based on at least one event associated with the transaction, and
    wherein further, audio detection is employed to determine whether the protected data is about to be presented, and responsive to said audio detection, initiating the first timing trigger.

10. The video system of claim 9, comprising: responsive to receiving the first timing trigger, the processing system configured to suspend recording the scene using the first video camera; and responsive to receiving the second timing trigger, the processing system configured to suspend recording the scene using the second video camera.

11. The video system of claim 9, wherein the processing system is configured to record the scene using the first video camera to a video file on the data storage system to record the scene to the data storage system using the first video camera; wherein the processing system is configured to record the scene using the second video camera to the video data file on the data storage system and suspend recording the scene to the video file using the first video camera to continue the recording of the scene to the data storage system using the second video camera; and wherein the processing system is configured to record the scene to the video data file on the data storage system and suspend recording the scene to the video file using the second video camera to continue the recording of the scene to the data storage system using the first video camera.

12. The video system of claim 9, comprising: the processing system configured to record the scene using the first video camera to a first video file, and record the scene using the second video camera to a second video file; responsive to receiving the first timing trigger, the processing system configured to continue recording the scene using the first video camera and record a first timing trigger value to the data storage system; and responsive to receiving the second timing trigger, the processing system configured to continue recording the scene using the second video camera and record a second timing trigger value to the data storage system.

13. The video system of claim 12, comprising: in response to a request for the first video file, the processing system configured to transfer a first portion of the first video file until indicated by the first timing trigger value; in response to the first timing trigger value, the processing system configured to suspend transfer of the first portion of the first video file and transfer a first portion of the second video file until indicated by the second timing trigger value; in response to the second timing trigger value, the processing system configured to transfer a second portion of the first video file and cease transfer of the second video file.

14. The video system of claim 9, wherein the first timing trigger comprises an event associated with the transaction.

15. The video system of claim 9, wherein the first video camera comprises a greater video resolution than the second video camera.

16. The video system of claim 9, wherein the second video camera captures the scene from a different angle than the first video camera, and wherein the second video camera is not capable of capturing the protected data involved in the transaction at the different angle.

17. A non-transitory computer readable medium having instructions stored thereon, that when executed, perform the steps of:
 recording the scene to a data storage system using a first video camera capable of capturing protected data associated with the transaction;
 while recording the scene using the first video camera, responsive to receiving a first timing trigger, continuing the recording of the scene to the data storage system using a second video camera not capable of capturing the protected data; and
 while recording the scene using the second, different video camera, responsive to receiving a second timing trigger, continuing the recording of the scene to the data storage system using the first video camera;
 wherein the first timing trigger and the second timing trigger are initiated based on at least one event associated with the transaction; and
 wherein further, audio detection is employed to determine whether the protected data is about to be presented, and responsive to said audio detection, initiating the first timing trigger.

18. The non-transitory computer readable medium of claim 17 having further instructions stored thereon, that when executed, perform the steps of: responsive to receiving the first timing trigger, suspending recording the scene using the first video camera; and responsive to receiving the second timing trigger, suspending recording the scene using the second video camera.

19. The non-transitory computer readable medium of claim 17:
 wherein recording the scene to the data storage system using the first video camera comprises recording the scene using the first video camera to a video file on the data storage system; wherein continuing the recording of the scene to the data storage system using the second video camera comprises recording the scene using the second video camera to the video data file on the data storage system and suspending recording the scene to the video file using the first video camera; and wherein continuing the recording of the scene to the data storage system using the first video camera comprises recording the scene to the video data file on the data storage system and suspending recording the scene to the video file using the second video camera.

20. The non-transitory computer readable medium of claim 17 having further instructions stored thereon, that when executed, perform the steps of: recording the scene using the first video camera to a first video file; recording the scene using the second video camera to a second video file; responsive to receiving the first timing trigger, continuing recording the scene using the first video camera and recording a first timing trigger value to the data storage system; and responsive to receiving the second timing trigger, continuing recording the scene using the second video camera and recording a second timing trigger value to the data storage system.

* * * * *